(12) United States Patent
Telesco et al.

(10) Patent No.: US 11,597,334 B2
(45) Date of Patent: Mar. 7, 2023

(54) VEHICLE CONSOLE ASSEMBLY

(71) Applicant: Havis, Inc., Warminster, PA (US)

(72) Inventors: Stephen Telesco, Dexter, MI (US); Joseph Bernert, Hatboro, PA (US); Christopher Bernert, Bryn Mawr, PA (US); Adam Carriere, Ann Arbor, MI (US); Samuel Legg, Jamison, PA (US)

(73) Assignee: Havis, Inc., Warminster, PA (US)

( * ) Notice: Subject to any disclaimer, the term of this patent is extended or adjusted under 35 U.S.C. 154(b) by 148 days.

(21) Appl. No.: 17/119,619

(22) Filed: Dec. 11, 2020

(65) Prior Publication Data

US 2022/0185201 A1 Jun. 16, 2022

(51) Int. Cl.
*B60R 13/02* (2006.01)
*B60R 11/02* (2006.01)
(Continued)

(52) U.S. Cl.
CPC ...... *B60R 13/0262* (2013.01); *B60R 13/0206* (2013.01); *B60R 7/04* (2013.01);
(Continued)

(58) Field of Classification Search
CPC ... B60R 12/0262; B60R 12/0206; B60R 7/00; B60R 7/04; B60R 7/06; B60R 11/02;
(Continued)

(56) References Cited

U.S. PATENT DOCUMENTS

| 3,550,001 A | * | 12/1970 | Hanley | H04L 13/02 |
| | | | | 455/345 |
| 3,650,444 A | * | 3/1972 | Gibson | B60R 11/02 |
| | | | | 455/99 |

(Continued)

FOREIGN PATENT DOCUMENTS

| JP | 2007083819 A | * | 4/2007 | ............. B60R 7/04 |
| JP | 2020157996 A | * | 10/2020 | ............. B60R 11/02 |
| KR | 101640551 B | * | 5/2013 | ............. B60R 7/04 |

OTHER PUBLICATIONS

Sato, "Attachment Structure of On-Vehicle Devices", Jan. 10, 2020, Japanese Patent Office, Edition: JP-2020157996-A (Year: 2020).*

(Continued)

*Primary Examiner* — Dennis H Redder
*Assistant Examiner* — Joyce Eileen Hill
(74) *Attorney, Agent, or Firm* — RatnerPrestia (57) ABSTRACT

A console assembly having a hood and a shroud. The hood has one or more base mounting points configured for installation to a vehicle body structure, and one or more accessory mounting points spaced from and rigidly connected to the one or more base mounting points. The shroud defines an enclosed volume, and is configured to install over the hood, with the one or more base mounting points contained within the enclosed volume, and the one or more accessory mounting points located outside the enclosed volume. When the hood is attached to the vehicle body structure and the shroud is installed over the hood, the hood is configured to convey respective loads applied to the one or more accessory mounting points to the one or more base mounting points independently of the shroud. A hood assembly and a method for installing a console assembly are also provided.

32 Claims, 6 Drawing Sheets

(51) Int. Cl.
*B60R 7/04* (2006.01)
*B60R 7/06* (2006.01)
*B60R 11/00* (2006.01)
*B62D 65/14* (2006.01)

(52) U.S. Cl.
CPC ............... *B60R 7/06* (2013.01); *B60R 11/02* (2013.01); *B60R 2011/0007* (2013.01); *B62D 65/14* (2013.01)

(58) Field of Classification Search
CPC .... B60R 2011/0003; B60R 2011/0007; B60H 1/0055; B60H 1/00564; B62D 65/14; B62D 25/20; F16M 13/02; F16M 11/00; A47B 3/10; A47B 3/106; B60N 3/001; H04B 1/3822; H04B 1/082
USPC ......... 296/1.08, 193.01, 24.34, 24.44, 37.12, 296/37.8; 224/42.32; 379/453, 454, 455
See application file for complete search history.

(56) References Cited

U.S. PATENT DOCUMENTS

| | | | | |
|---|---|---|---|---|
| 3,685,708 | A | * | 8/1972 | Herrington ............. B60R 11/02 224/567 |
| 4,061,971 | A | * | 12/1977 | Barrons .............. B60R 11/0205 224/570 |
| 2016/0257266 | A1 | * | 9/2016 | Buza ..................... B62D 65/14 |

OTHER PUBLICATIONS

Aoki et al., "Floor Console Mounting Structure", May 4, 2007, Japanese Patent Office, Edition: JP-2007083819-A (Year: 2007).*

Kim et al., "Structure of Cup Holder for Vehicle", May 13, 2016, Korean Patent Office, Edition: KR101640551B (Year: 2016).*

* cited by examiner

VEHICLE CONSOLE ASSEMBLY

TECHNICAL FIELD

The present invention relates generally to mounting systems, and more particularly, to systems for securely mounting objects within a moving vehicle.

BACKGROUND

Specialized vehicles are an essential tool in many different professions. For example, professions such as law enforcement commonly utilize a number of specialized electronic systems (e.g., computers, radio systems, sirens) that are not found in conventional automobiles. Other professions and enterprises also commonly have a need to use vehicles with similar specialized equipment. For example, customized electronics systems are frequently installed in vehicles such as forklifts, waste collection trucks, utility trucks, construction equipment and agricultural equipment. While vehicles may be specially manufactured that include these systems, these systems may also be added to conventional automobiles or other vehicles through after-market installations. This is particularly true in the context of law enforcement vehicles, because these vehicles are usually based on conventional road vehicles, and each vehicle can require unique customizations depending upon the particular requirements of the jurisdiction or purpose.

While vehicles are commonly fitted with custom electronics and other equipment, it can be problematic to install such devices in a simple and effective manner. For example, conventional vehicle interior cabins may lack hard points that are suitable for holding the weight of the equipment without requiring significant reinforcement. This leads to irregular and relatively inefficient mounting of such devices.

There remains a need to provide alternative systems for mounting equipment in vehicles, and particularly for retrofitting existing vehicles to include new or alternative equipment.

SUMMARY

Aspects of the present invention are directed to console assemblies for mounting objects within a vehicle.

In one exemplary aspect, there is provided a console assembly having: a hood comprising one or more base mounting points configured for installation to a vehicle body structure, and one or more accessory mounting points spaced from and rigidly connected to the one or more base mounting points; and a shroud defining an enclosed volume, the shroud being configured to install over the hood, with the one or more base mounting points contained within the enclosed volume, and the one or more accessory mounting points located outside the enclosed volume. When the hood is attached to the vehicle body structure and the shroud is installed over the hood, the hood is configured to convey respective loads applied to the one or more accessory mounting points to the one or more base mounting points independently of the shroud.

In some aspects, the hood comprises one or more structural elements extending between and including the one or more base mounting points and the one or more accessory mounting points.

In some exemplary aspects, the one or more structural elements comprise one or more sheetmetal, cast metal, or machined metal parts.

In some exemplary aspects, the one or more structural elements comprise: a first leg having at least one first base mounting point; a second leg having at least one second base mounting point; and a platform having at least one first accessory mounting point.

In some exemplary aspects, the platform comprises a unitary part that is separate from and configured to be attached to the first leg and the second leg, In some exemplary aspects, each of the first leg and the second leg comprises a respective separate unitary part.

In some exemplary aspects, the platform is configured to be attached to the first leg at a first connection point, and to the second leg at a second connection point, and wherein the first connection point and the second connection point are located within the enclosed volume when the hood is attached to the vehicle body and the shroud is installed over the hood.

In some exemplary aspects, the platform is configured to be attached to the first leg and to the second leg while the first leg, the second leg and the shroud are attached to the vehicle body.

In some exemplary aspects, the shroud comprises an opening configured to receive at least a portion of the platform, a first access port positioned adjacent to the first connection point, and a second access port positioned adjacent to the second connection point.

In some exemplary aspects, the shroud comprises a first access port closure configured to selectively close the first access port, and a second access port closure configured to selectively close the second access port.

In some exemplary aspects, the shroud is configured to be connected to the vehicle body structure at one or more locations independent of the one or more base mounting points.

In some exemplary aspects, the shroud is configured to be connected to the hood at one or more locations.

In some exemplary aspects, the one or more base mounting points are configured to install to a drivetrain tunnel of an automobile body.

In some exemplary aspects, the shroud is configured as a center console configured to cover the drivetrain tunnel.

In some exemplary aspects, the console assembly further comprises a shroud mount configured to be attached to the drivetrain tunnel at a location remote from the hood, and the shroud extends between and covers the one or more base mounting points and the shroud mount.

In some exemplary aspects, the shroud comprises one or more storage locations, and the one more accessory mounting points comprises a horizontally-extending mounting platform located above the one or more storage locations.

In another exemplary aspect, there is provided a console accessory mounting hood comprising: a first leg having respective front and rear mounting points displaced along a longitudinal direction and configured to secure to a drivetrain tunnel of an automobile body; a second leg having respective front and rear mounting points displaced along the longitudinal direction and configured to secure to the drivetrain tunnel; and a platform connected to the first leg and the second leg and, when the respective front and rear mounting points of the first leg and the second leg are positioned to be secured to the vehicle body, the platform is positioned above the drivetrain tunnel, first leg and the second leg, and extends in a lateral direction transverse to the longitudinal direction. The platform comprises at least one accessory mounting point, and the platform, the first leg and the second leg are configured to convey loads from the at least one accessory mounting point to the vehicle body.

In some exemplary aspects, the console accessory mounting hood further comprises a cross-brace secured to and extending between the first leg and the second leg, with the cross-brace being located above the respective front and rear mounting points of the first leg and the second leg and below the platform when the respective front and rear mounting points of the first leg and the second leg are positioned to be secured to the vehicle body.

In some exemplary aspects, the platform is connected to the first leg by one or more first fasteners, and the platform is connected to the second leg by one or more second fasteners.

In some exemplary aspects, the platform and the first leg are configured such that the one or more first fasteners are installed along the lateral direction on a path extending towards the second leg, and wherein the platform and the second leg are configured such that the one or more second fasteners are installed along the lateral direction on a path extending towards the first leg.

In some exemplary aspects, the first leg comprises a first planar portion extending perpendicular to the lateral direction; the second leg comprises a second planar portion extending perpendicular to the lateral direction; the platform comprises a third planar portion extending perpendicular to the lateral direction and positioned in contact with the first planar portion when the platform is connected to the first leg by the one or more first fasteners; and the platform comprises a fourth planar portion extending perpendicular to the lateral direction and positioned in contact with the second planar portion when the platform is connected to the second leg by the one or more second fasteners.

In some exemplary aspects, the first leg, the second leg, and the platform are configured such that, when the one or more first connectors are not connecting the first leg to the platform and the one or more second connectors are not connecting the second leg to the platform, the platform is movable parallel to the longitudinal direction to simultaneously slide the third planar portion along the first planar portion and the fourth planar portion along the second planar portion.

In some exemplary aspects, the first leg comprises a first sheetmetal part having a respective vertical portion and at least one respective horizontal portion extending in the lateral direction from the vertical portion, and the respective front and rear mounting points comprise front and rear mounting holes located in the at least one horizontal portion; the second leg comprises a second sheetmetal part having a respective vertical portion and at least one respective horizontal portion extending in the lateral direction from the vertical portion, and the respective front and rear mounting points comprise front and rear mounting holes located in the at least one horizontal portion.

In some exemplary aspects, the platform comprises: a horizontal center section extending in the lateral direction from a first end to a second end; a first vertical portion extending from the first end towards the respective front and rear mounting points of the first leg; and a second vertical portion extending from the second end towards the respective front and rear mounting points of the second leg. The first vertical portion is configured to connect to the respective vertical portion of the first leg, and the second vertical portion is configured to connect to the respective vertical portion of the second leg.

In some exemplary aspects, the respective front and rear mounting points of the first leg comprise two or more first mounting holes arranged along the longitudinal direction; and the respective front and rear mounting points of the second leg comprise two or more second mounting holes arranged along the longitudinal direction.

In another exemplary aspect, there is provided a method for installing a console assembly, the method comprising: rigidly securing a hood having one or more base mounting points and one or more accessory mounting points spaced from and rigidly connected to the one or more base mounting points to an automobile at a drivetrain tunnel of the automobile via the one or more base mounting points; and securing a shroud defining an enclosed volume to the automobile with the one or more base mounting points contained within the enclosed volume, and the one or more accessory mounting points located outside the enclosed volume.

In some exemplary aspects, the method further comprises attaching an accessory to at least one of the one or more accessory mounting points such that a weight of the accessory is transferred via the hood to the drivetrain tunnel independently of the shroud.

In some exemplary aspects, the hood comprises: a first leg having at least one first base mounting point; a second leg having at least one second base mounting point; and a platform having at least one first accessory mounting point, wherein the platform comprises a unitary part that is separate from and configured to be attached to the first leg and the second leg.

In some exemplary aspects, rigidly securing the hood to an automobile at a drivetrain tunnel of the automobile comprises: securing the at least one first base mounting point to the drivetrain tunnel; securing the at least one second base mounting point to the drivetrain tunnel; and securing the platform to the first leg and the second leg.

In some exemplary aspects, securing the platform to the first leg and the second leg is performed after securing the shroud to the automobile.

In some exemplary aspects, securing the platform to the first leg and the second leg comprises: inserting a portion of the platform into the enclosed volume; securing the portion of the platform to the first leg at a first connection point located within the enclosed volume; and securing the portion of the platform to the second leg at a second connection point located within the enclosed volume.

In some exemplary aspects, the shroud comprises a first access port positioned adjacent to the first connection point, and a second access port positioned adjacent to the second connection point, and the method further comprises: securing a first access port closure to close the first access port after securing the portion of the platform to the first leg at the first connection point; and securing a second access port closure to close the second access port after securing the portion of the platform to the second leg at the second connection point.

In some exemplary aspects, each of the first leg and the second leg comprises a respective separate unitary part.

In some exemplary aspects, securing the at least one first base mounting point to the drivetrain tunnel is performed independently from securing the at least one second base mounting point to the drivetrain tunnel.

In some exemplary aspects, the method further comprises securing a cross-brace to the first leg and the second leg before securing the shroud to the automobile.

In some exemplary aspects, securing the shroud to the automobile comprises securing at least a portion of the shroud to the hood.

In some exemplary aspects, securing the shroud to the automobile comprises: securing a shroud mount to the drivetrain tunnel at a location spaced from the hood; and securing the shroud to the shroud mount and the hood with the shroud mount within the enclosed volume.

In some exemplary aspects, the shroud is configured as a center console having one or more storage locations.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be omitted. In addition, according to common practice, the various features of the drawings are not drawn to scale unless otherwise indicated, and the dimensions of the various features may be expanded or reduced for clarity. Included in the drawings are the following figures.

DETAILED DESCRIPTION

The systems disclosed herein are usable to provide mounting for objects within conventional vehicles (such as automobiles). While the disclosed systems are described herein with respect to mounting within the cabin of a vehicle, it will be understood that the invention is not so limited. To the contrary, aspects of the present invention are usable in any application in which a mount is desired.

While any objects may be mounted to the disclosed exemplary embodiments, the disclosed mounting systems are particularly suitable for mounting electronic devices, such as laptops, tablets, radios, or the like. Other electronic devices or objects mountable with the disclosed systems will be known to those of ordinary skill in the art from the description herein. The mounting systems may be configured to hold the device in affixed position, or to allow the device to move (e.g., rotate, pivot, etc.) between various positions (e.g., use and stowed positions, driver-side and passenger-side use positions, movement to accommodate user preferences, etc.). In addition, mounting systems may be configured to mount multiple devices.

Figure 1:
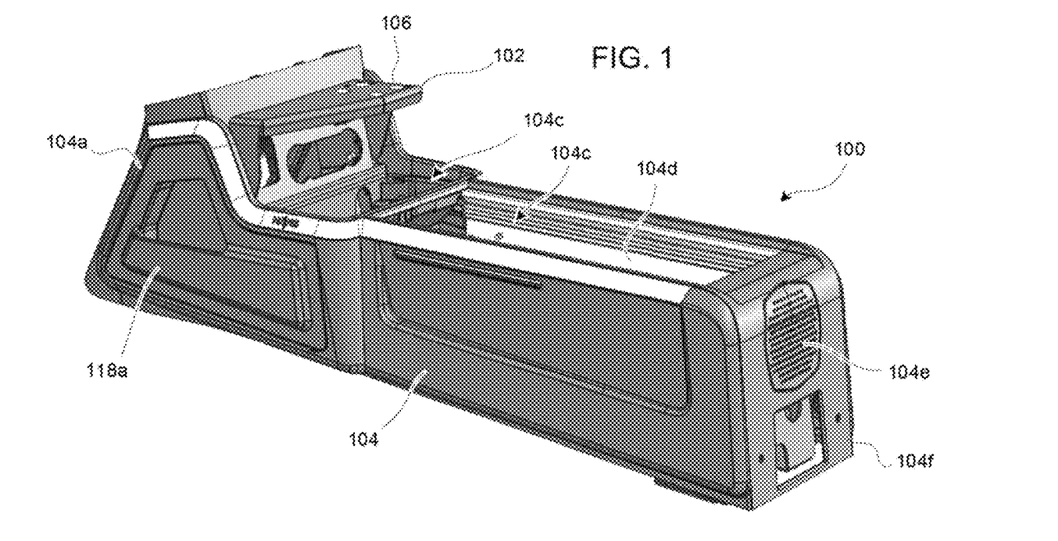
FIG. 1 is a perspective view of an exemplary console assembly.

With reference to the drawings, FIG. 1 illustrates an exemplary console assembly 100 for mounting one or more objects within a vehicle cabin. The console assembly 100 is configured as a center console assembly that is intended to be located along the fore-aft centerline of a vehicle between the front seating positions, and generally within arm's reach of the driver. The console assembly 100 generally includes a hood 102 and a shroud 104 that is configured to install over the hood 102. The hood 102 has one or more accessory mounting points 106, such as screw or rivet holes or the like, and may have any suitable shape.

The hood 102 comprises a structural member having sufficient rigidity and strength to securely fix one or more different types of accessories such as a laptop computer, computer display screen, radio communication device, and so on. For example, the hood 102 may comprise a metal part made of, for example, folded 20 gauge steel, cast aluminum, or the like. The load-bearing capacity of the hood 102 preferably is selected to hold the largest compatible accessory without substantial movement during normal operation of the accessory and movement of the vehicle. Persons or ordinary skill in the art will understand how to design the hood 102 to obtain the desired rigidity and strength based on known engineering principles, which need not be explained in detail herein.

Figure 2:
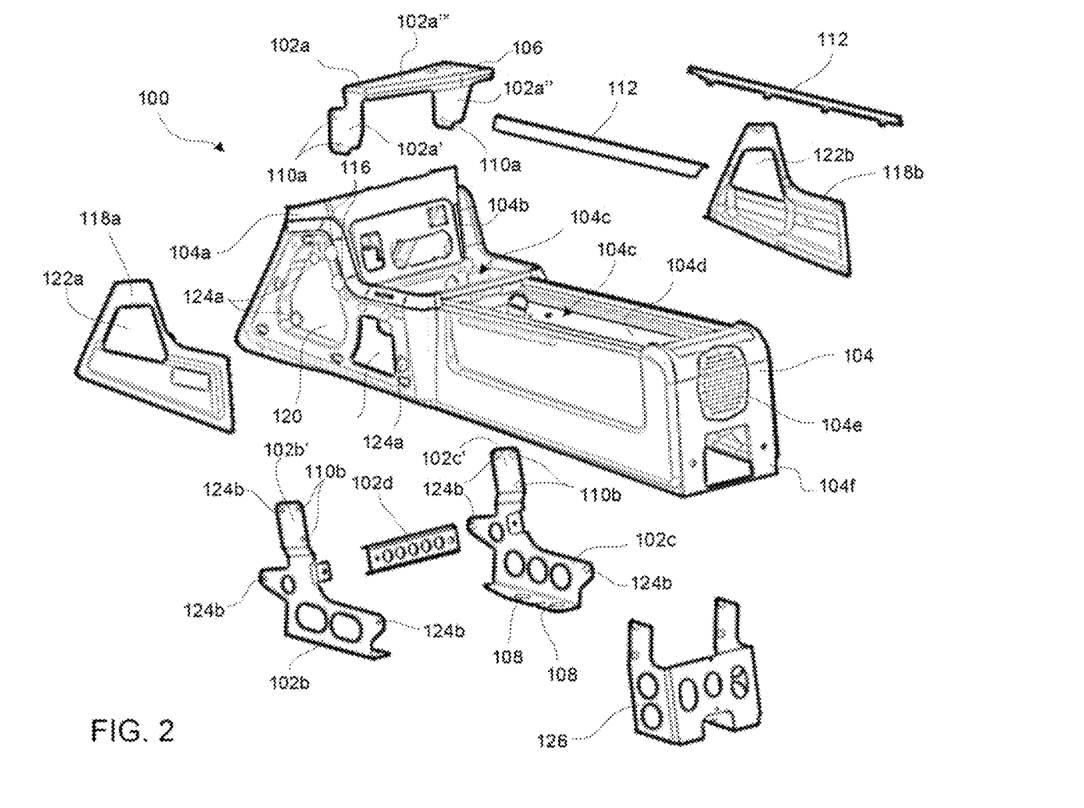
FIG. 2 is an exploded perspective view of an exemplary console assembly.

The hood 102 may comprise a single unitary part, or it may be an assembly of structural elements comprising multiple individual unitary parts. For example, as shown in FIG. 2, the hood 102 may be an assembly of parts including a platform 102*a*, a first leg 102*b*, a second leg 102*c*, and a cross-member 102*d*. The platform 102*a*, first leg 102*b*, second leg 102*c* and cross-member 102*d* may be connected to each other using any suitable means or combination of means, such as screws, nuts and bolts, rivets, welding, adhesives, and so on. The various parts of the hood 102 may be formed using any suitable materials. For example, one or more of the parts may comprise sheetmetal, cast metal, or machined metals parts. Steel and aluminum are considered to be suitable materials, but other materials, such as carbon fiber reinforce plastics or other composite materials may be used. Unreinforced structural plastics also may be used. Folded sheet metal is preferred for its low cost and high strength, but injection molded plastics, or cast or machined metal parts may be desirable to accommodate particularly complex shape requirements or reduce weight or part count.

The first leg 102*b* and second leg 102*c* each have one or more respective base mounting points 108, such as screw or rivet holes or the like. The base mounting points 108 are configured to secure to a vehicle body structure. For example, the lower ends of the first leg 102*b* and second leg 102*c* may be shaped to lie flush against a drivetrain tunnel of a particular vehicle, with the base mounting points 108 being positioned to receive fasteners to join the first leg 102*b* and second leg 102*c* to the drivetrain tunnel. When assembled, the accessory mounting points 106 are spaced from the base mounting points 108, and the hood 102 forms a rigid structure extending from the accessory mounting points 106 to the base mounting points 108. If necessary or desired, the cross-member 102*d* may be installed to connect the first leg 102*b* to the second leg 102*c* to reinforce the hood 102.

Each leg 102*b*, 102*c* preferably has at least two base mounting points 108, and at least two of these base mounting points 108 are preferably displaced along a longitudinal direction of the vehicle (e.g., along the longitudinal direction of the drivetrain tunnel or floorboard). As used herein, the "longitudinal" direction is the direction of normal forward driving of the vehicle in a horizontal plane, and the "lateral" direction is perpendicular to the longitudinal direction in the horizontal plane. Similarly, the first leg 102*b* and second leg 102*c* and their respective base mounting points 108 preferably are offset from each other in the lateral direction. The platform 102*a* extends in the lateral direction and connects the first leg 102*b* to the second leg 102*c*. The cross-brace 102*d* (if used) also extends in the lateral direction to connect the first leg 102*b* to the second leg 102*c*, at a location above the base mounting points 108 and below the platform 102*a*, to provide an intermediate load-bearing connection. This configuration, and ones like it, provides stable securement to transfer loads from the platform 102a to the vehicle body and provides multi-point support in the longitudinal and lateral directions. While this arrangement is preferred, other embodiments may rotate the assembly at angles relative to a vertical direction perpendicular to the horizontal plane. For example, the first leg 102b and second leg 102c and their respective base mounting points 108 may be offset from each other along the longitudinal direction, and the platform 102a may extend in the longitudinal direction to connect to the first leg 102b and the second leg 102c. Other alternatives and variations will be apparent to persons of ordinary skill in the art in view of the present disclosure.

Providing the hood 102 as an assembly of structural elements facilitates modification to fit the hood 102 into different vehicles. For example, the first leg 102b and second leg 102c may be provided in different versions having shapes or patterns of base mounting points 108 tailored to fit into particular vehicles. As another example platforms 102a may be provided in different shapes or have different accessory mounting points 106 to accommodate different vehicles or different accessories. Other alternatives and variations will be apparent to persons of ordinary skill in the art in view of the present disclosure.

Providing the hood 102 as an assembly of structural elements also facilitates certain installation methods. For example, the platform 102a may be configured to attach to the remainder of the hood 102, after the shroud 104 is positioned over the remainder of the hood 102, as explained in more detail below. In this case, the portion of the hood 102 located below the shroud 104 may comprise multiple parts, such as the first leg 102b, the second leg 102c and the cross-member 102d, or it may comprise a single unitary part (e.g., a single cast part having base mounting points 108).

Embodiments that allow the platform 102a to be installed after the remainder of the hood 102 is covered by the shroud 104 require a means to connect the platform 102a to the remainder of the hood 102. In the example of FIG. 2, the platform 102a has two depending leg extensions, each of which has one or more first connection points 110a that correspond to respective second connection points 110b on the first leg 102b and the second leg 102c. Each connection point 110a, 110b comprises one or more fastener holes or the like. For example, the connection points 110a, 110b may comprise threaded holes formed in the first leg 102b and second leg 102c, respectively, and unthreaded holes formed in the platform 102a. In this case, screws can be passed through the holes in the platform 102a, and threaded into the holes in the first leg 102b and second leg 102c. The first connection points 110a and second connection points 110b may comprise any other suitable structure for making a secure connection. For example the connection points 110a, 110b may both comprise unthreaded holes, or may simply be predetermined locations for installing a self-tapping machine screw or the like.

When assembled, the first connection points 110 and second connection points 110b may be located inside or outside an enclosed volume 114 formed by the shroud 104. If the second connection points 110b are within the enclosed volume 114, such as in the example of FIGS. 1-3, the shroud 104 may include one or more openings through which fasteners can be secured to join the platform 102a to the remainder of the hood 102, as explained below.

The shroud 104 comprises a unitary part or an assembly of parts that form a decorative and/or functional cover. The shroud 104 may comprise a simple box-like shape formed of lightweight sheetmetal or plastic, but it may be configured to conform with the aesthetics of the vehicle interior, such as by providing a decorative shape and adding trim pieces 112 or the like. In the shown example, the shroud 104 has a forward region 104a having one or more openings 104b, such as slots, through which respective portions of the hood 102 can pass. In this case, the platform 102a has lower plate-like extensions that fit through respective slot openings 104b. The shroud 104 also may be configured to hold existing vehicle electronics, such as instruments, vehicle controls, switches, power ports, and the like. For example, the forward region 104a may include ports for holding an electric parking brake switch, a power port, or the like. The shroud 104 also may include one or more receptacles 104c to receive loose items (e.g., a cup holder), or operative accessories such as radios, siren and light controls, and the like. For example, in this case, a first receptacle 104c is provided below and may be partially covered by the horizontally-extending platform 102a, and a second receptacle 104c is provided behind the front receptacle 104c. Either receptacle 104c may be fitted with structures for mounting accessories. For example, the rearmost receptacle 104c may have internal sidewalls 104d with standardized rails for mounting various electronics. The receptacles 104c or sidewalls 104d may be reinforced with aluminum extrusions or the like to support the weight of installed electronics or the like. The shroud 104 also may include features such as ventilation ports 104e for existing vehicle ventilation systems, cabin lights, or the like.

Figure 3:
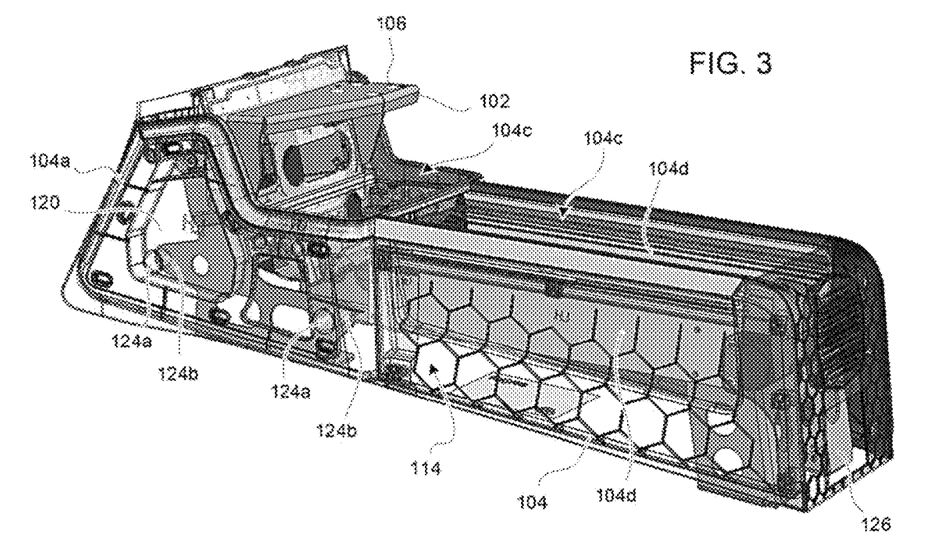
FIG. 3 is a perspective view of an exemplary console assembly, with the shroud depicted transparently to show parts within an internal volume of the shroud.

As best shown in FIG. 3, the shroud 104 defines an enclosed volume 114 that contains the base mounting points 108 and the lower portions of the hood 102 when the shroud 104 is installed. A portion of the hood 102 having the one or more accessory mounting points 106 is located outside the enclosed volume 114 to allow ready access to install and remove accessories at the accessory mounting points 106.

The shroud 104 preferably comprises a lightweight, low-cost material that is easily formed in to a complex shape, such as an injection moldable plastic. Suitable plastics may include acrylonitrile-butadiene-styrene (ABS), ABS/polycarbonate alloys, polycarbonates, polypropylene, modified polyphenylene ether (PPE) and SMA (styrene-maleic anhydride) resins. Regardless of the selected material, the shroud 104 is configured such that it is not part of the load path between the accessory mounting points 106 and the base mounting points 108. Rather, the hood 102 is configured to convey loads applied to the accessory mounting points 106 to the base mounting points 108 independently of the shroud 104. This construction can simplify the overall design of the console assembly 100, and reduce overall reduce weight and construction cost. This construction also allows the shroud 104 to be reconfigured to fit different vehicles or to have different features, without necessarily requiring a change to the hood 102.

To provide rigid support at the accessory mounting points 106, the hood 102 preferably is configured to secure to a structural part of the vehicle. As used herein, a "structural part" is any part of the vehicle that is rigidly connected to or forms a rigid part of the vehicle body. Exemplary structural parts include sheetmetal panels such as those that form a portion of a vehicle body (i.e., a unibody frame or the body portion of a body-on-frame vehicle). Such panels may be in the form of a floorboard or a drivetrain tunnel (i.e., a portion of the floorboard that is raised to form a tunnel to accommodate one or more vehicle drive elements, such as an engine, transmission, propeller shaft, transfer case, differential, and so on). Other exemplary structural parts include dashboard support frames, engine bulkheads, subframes that are attached to the vehicle body, and the like.

In the shown example, the platform 102a is configured to be attached to the first leg 102b and the second leg 102c while the first leg 102b, the second leg 102c and the shroud 104 are attached to the vehicle body, and the second connection points 110b are located within the enclosed volume 114 of the shroud 104. To this end, the shroud 104 may include one or more access ports 116, such as openings or slots, located adjacent to the second connection points 110b on the first leg 102b and second leg 102c. The access ports 116 are positioned to allow access to the second connection points 110b within the enclosed volume 114, such as by being located along an axis perpendicular to the holes forming the second connection points 110b.

In the shown example, each connection point 110a, 110b comprises screw holes, and the shroud 104 has an access port 116 corresponding to each connection point 110a, 110b. The first and second connection points 110a, 110b are provided on parallel planar portions of the first and second legs 102b, 102c and the platform 102a. Specifically, the second connection points 110b of the first leg 102b are located in a first planar portion 102b' of the first leg 102b, and the second connection points 110b of the second leg 102c are located in a second planar portion 102c' of the second leg 102c. Similarly, the platform 102a has a third planar portion 102a' and a fourth planar portion 102a", in which the first connection points 110a are located. The third and fourth planar portions 102a', 102a" extend down vertically from respective ends of a horizontal center section 102a of the platform 102a towards the respective base mounting points 108 of a respective leg 102b, 102c. These parts can be conveniently formed by folded sheetmetal, but other constructions may be used.

The first, second, third and fourth planar portions 102b', 102c', 102a', 102a" all extend along parallel planes, and are positioned such that third planar portion 102a' is positioned to contact the first planar portion 102b' and the fourth planar portion 102a" is positioned to contact the second planar portion 102c' when the platform 102a is secured to the first and second legs 102b, 102c. In this configuration, the platform 102a can slide along the parallel planes of the planar portions, to thereby slide the third and fourth planar portions 102a', 102a" next to the first and second planar portions 102b', 102c'. In the shown example, the planar portions all lie in planes that extend in the longitudinal and vertical directions (i.e., orthogonal to the lateral direction), which facilitates up and down and fore-aft sliding of the planform 102a to place it in the proper location to secure to the first leg 102b and the second leg 102c.

The platform 102a is installed by sliding the portions of the platform 102a having the first connection points 110a through the slot openings 104b, aligning the first connection points 110a with the second connection points 110b, and passing fasteners through the access ports 116 to secure the platform 102a to the first leg 102b and second leg 102c. In this case, the fasteners securing the platform 102a to the first leg 102b may be installed along the lateral direction on a path extending towards the second leg 102c, and the fasteners securing the platform 102a to the second leg 102c may be installed along the lateral direction on a path extending towards the first leg 102b. The platform 102a preferably can be removed, with the shroud 104 remaining in place, by reversing the procedure.

The illustrated embodiment allows access to secure the platform 102a to, and remove the platform 102a from, the remainder of the hood 102. Such securement and removal is performed by installing or releasing fasteners that hold the parts together. In other cases, securement at the connection points 110a, 110b may be achieved using blind connectors, such as corresponding snap-fitting features on the platform 102a and the remainder of the hood 102. Such blind connectors engage automatically as the platform 102a is inserted into place relative to the rest of the hood 102. For example, the platform 102a may include flexible tabs that flex as the platform 102a is moved into place, then snap into place in receptacles formed in the first leg 102b and second leg 102c to hold the parts together. If blind connectors are used, disassembly may not be possible without damaging one or both of the hood 102 and the shroud 104. However, in some cases, an access opening may be provided (or created) in the shroud 104 to insert a tool to release a blind connector. For example, the shroud 104 may include holes to receive a pin or rod to push on a flexible tab of a snap-fit connector to release its engagement from the corresponding receptacle and allow disconnection of the platform 102a from the remainder of the hood 102. Other alternatives and variations will be apparent to persons of ordinary skill in the art in view of the present disclosure.

If access ports 116 are provided through the shroud 104, the console assembly 100 also may include access port closures 118a, 118b to selectively cover the access ports 116 when they are not being used. The access port closures 118a, 118b may comprise any suitable structure to cover the access ports 116. In the shown example, the access ports 116 are located within recesses 120 formed on each side of the shroud 104, and the access port covers 118a, 118b are shaped to cover the recesses 120. For added utility, the access port covers 118a, 118b may cooperate with the recesses 120 to form functional storage pockets that are accessed through openings 122a, 122b in the access port covers 118a, 118b.

The embodiment of FIGS. 2 and 3 also includes one or more auxiliary access openings 128 through the shroud 104. These provide access to the enclosed volume 114 for purposes other than securing the shroud 104. For example, the auxiliary access openings may provide access for mounting a fuse block or other accessories inside the enclosed volume 114. Such auxiliary access openings 128 may be covered by the access port closures 118a, 118b, by separate closures (not shown), or remain open.

The shroud 104 may be secured in place by connecting it to the hood 102, to other parts of the vehicle (e.g., adjacent trim molding or the vehicle body), or by a combination of connections. In the shown example, the shroud 104 is secured to the hood 102 at one or more fastener locations 124a on the shroud 104 that correspond to fastener locations 124b on the hood 102. The access port closures 118a, 118b may be configured to enclose the shroud fastener locations 124a when installed on the shroud 104. In other embodiments, one or more of the fastener locations 124a may be located adjacent to parts of the vehicle, such as adjacent dashboard trim pieces or to the vehicle body, such that the shroud 104 (or portions thereof) may be attached to the vehicle independently of the hood 102.

In the shown example, the shroud 104 is configured as a center console configured to cover the vehicle's drivetrain tunnel. The shroud 104 extends to a rearward region 104f located remotely from the hood 102. The rearward region 104f may be supported by an additional rigid support, such as a shroud mount 126 comprising a rigid structure that is connected to the vehicle at a location remote from the hood 102. The shroud mount 126 may comprise a folded metal structure, or other constructions, such as one or more cast or machined parts. Metals are preferred, but structural plastics may be used. The shroud mount 126 is rigidly connected to the drivetrain tunnel at a location behind the hood 102, and when the parts are assembled the shroud mount 126 may be located within, partially within, or outside the enclosed volume 114 of the shroud 104. The shroud 104 may be secured to the shroud mount 126 by fasteners, such as described previously herein. In the example of FIGS. 1-3, the shroud 104 is attached to the shroud mount 126 by screws that are passed through aluminum internal sidewalls 104*d* and into threaded holes in the shroud mount 126, but other constructions may be used.

Figure 4:
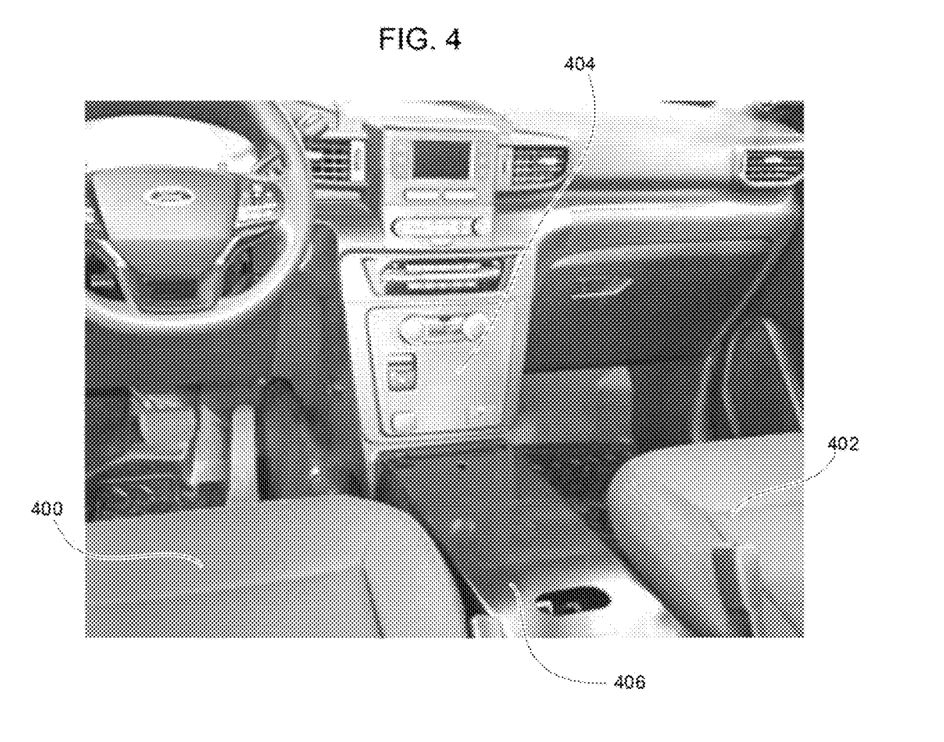
FIGS. 4 and 5 show an exemplary vehicle cabin prior to and after installation of an exemplary console assembly, respectively.
Figure 5:
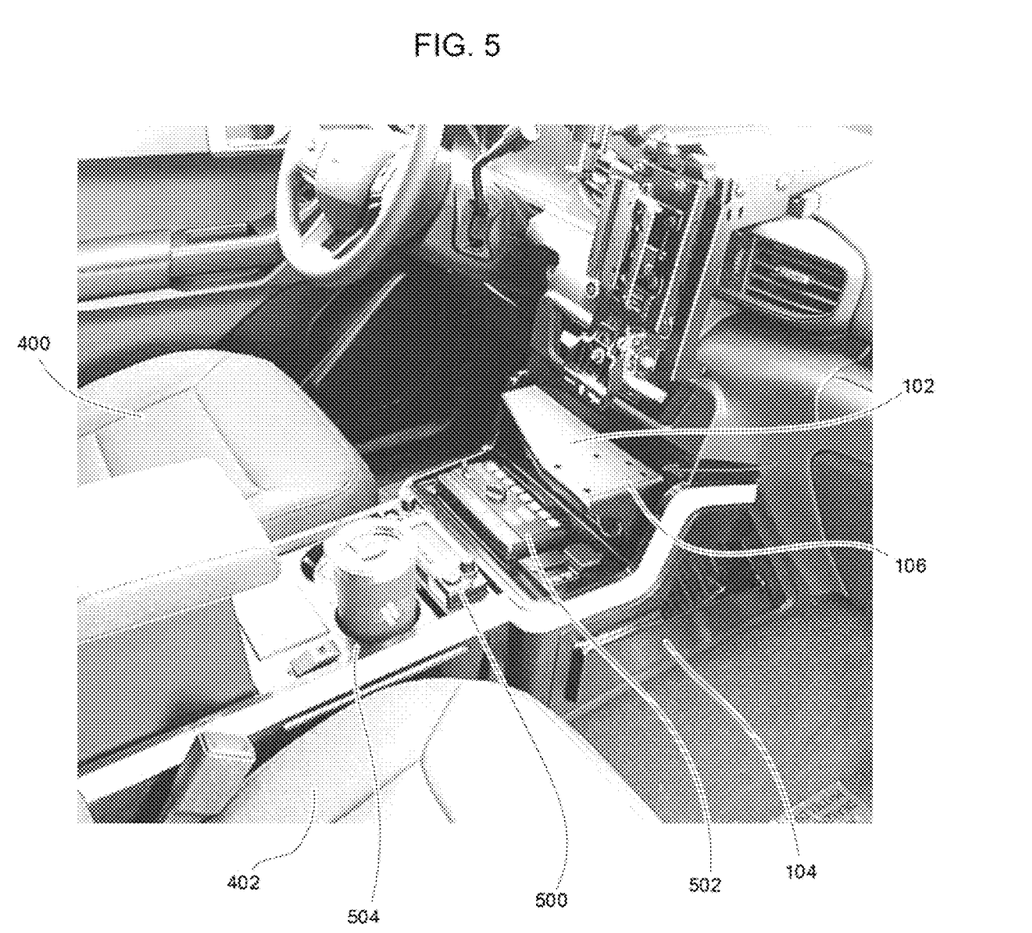

FIGS. 4 and 5 illustrate a vehicle cabin before and after installing an exemplary console assembly 100. As shown in FIG. 4, the cabin has a driver seating position 400 and passenger seating position 402, with a center console 404 between them. A sheetmetal drivetrain tunnel cover 406 is installed above the drivetrain tunnel. The drivetrain tunnel cover 406 may enclose functional features, such as ventilation ducts and electrical wires, but it may simply be cosmetic. The drivetrain tunnel cover 406 may comprise a structural part that is secured to the vehicle body and suitable for mounting further accessories or the like, but this is not required.

FIG. 5 illustrates the vehicle cabin after an exemplary console assembly 100 has been installed. The drivetrain tunnel cover 406 and a portion of the center console 404 have been removed, and replaced with a hood 102 and shroud 104. The hood 102 has accessory mounting points 106 to which one or more accessories can be mounted. The shroud 104 is fitted with a radio 500, a vehicle electronics control unit 502, cup holders 504 and the like.

Figure 6:
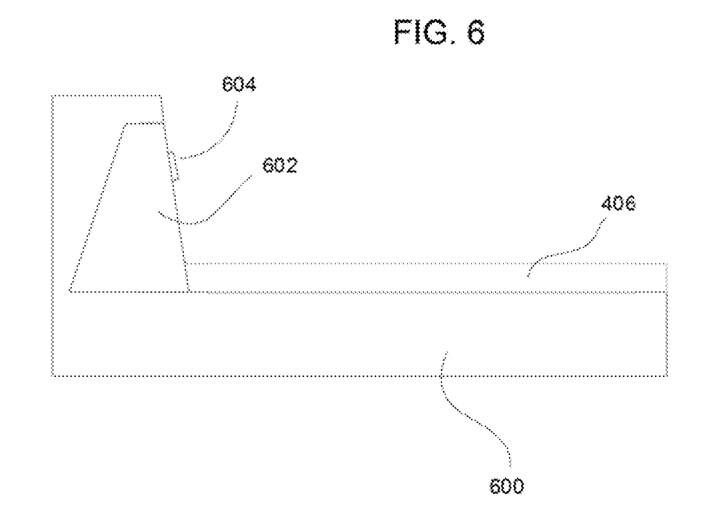
FIGS. 6-11 schematically illustrate a console assembly being installed on a vehicle drivetrain tunnel.

FIGS. 6-11 schematically illustrate an exemplary process for installing a console assembly 100. FIG. 6 shows the vehicle drivetrain tunnel 600 with a drivetrain tunnel cover 406 installed over it, and a center console panel 602 installed at the forward end of the drivetrain tunnel cover 406. One or more vehicle controls 604 or other mechanisms may be installed on the drivetrain tunnel cover 406 or center console panel. In this example, the vehicle control 604 may comprise, for example, an electronic parking brake activation switch.

Figure 7:
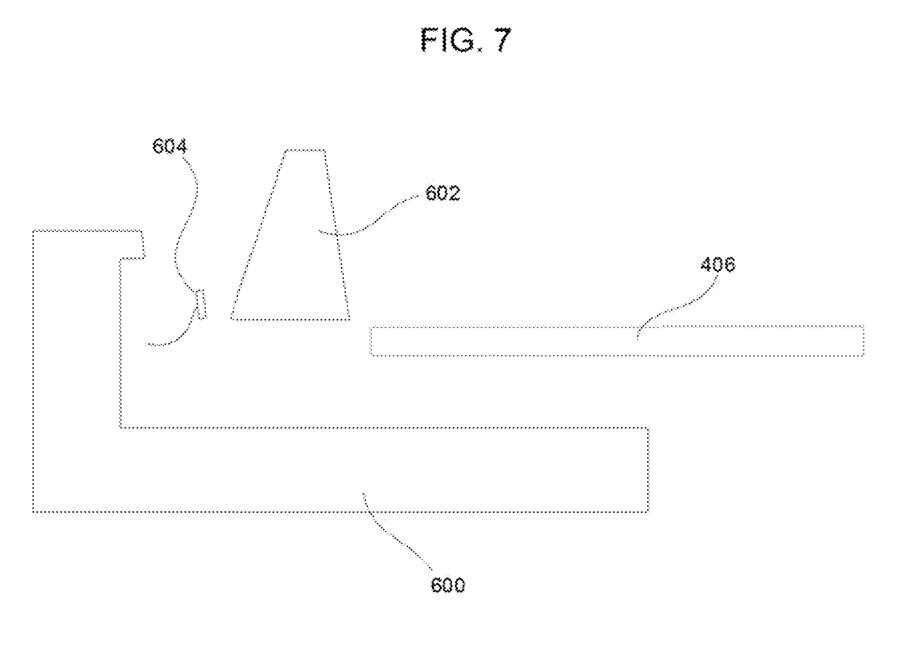

FIG. 7 shows the beginning of the installation process, in which the drivetrain tunnel cover 406 and center console panel 602 are removed. At this point, the vehicle controls 604 may be removed from the drivetrain tunnel cover 406 or center console panel 602. The vehicle controls 604 optionally may remain connected to the vehicle by wires or other connections.

Figure 8:
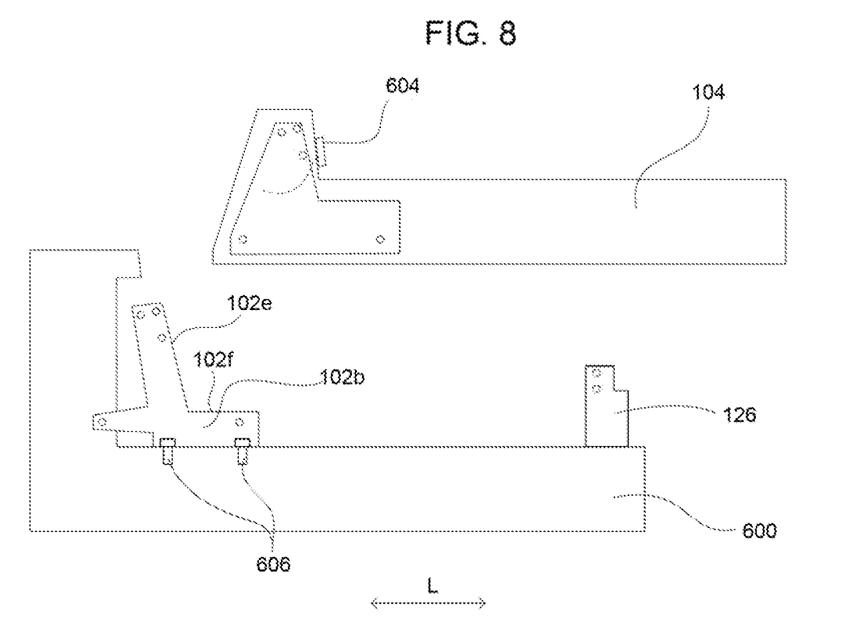

In FIG. 8, the hood legs 102*b*, 102*c* each have a respective vertical portion 102*e* and at least one respective horizontal portion 102*f* extending in the lateral direction from the vertical portion. Legs 102*b*, 102*c* are installed by rigidly securing them to the drivetrain tunnel 600 using one or more fasteners 606 at respective base mounting points 108 (only the left-side parts are shown in this side view). In this case, each leg is attached with at least two fasteners, such as screws, which are offset from each other in the longitudinal direction L. If used, a cross-brace 102*d* may be attached to connect the legs 102*b*, 102*c*. If used, a shroud mount 126 also may be installed on the vehicle body (preferably on the drivetrain tunnel 600) at a location spaced from the hood along the longitudinal direction L. At this point, the shroud 104 may be prepared by installing the vehicle controls 604 (if any).

Figure 9:
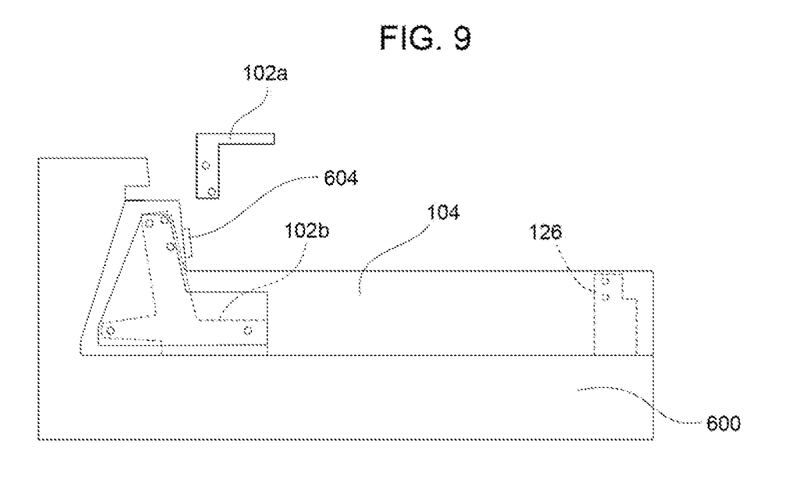

In FIG. 9, the shroud 104 is installed in the vehicle via securement to the hood legs 102*b*, 102*c*, shroud mount 126 (if used) and/or direct attachment to the drivetrain tunnel 600 or other parts. The shroud 104 defines an enclosed volume 114, in which the base mounting points 108 and hood legs 102*b*, 102*c* are at least partially contained. The hood platform 102*a* is then prepared for installation.

Figure 10:
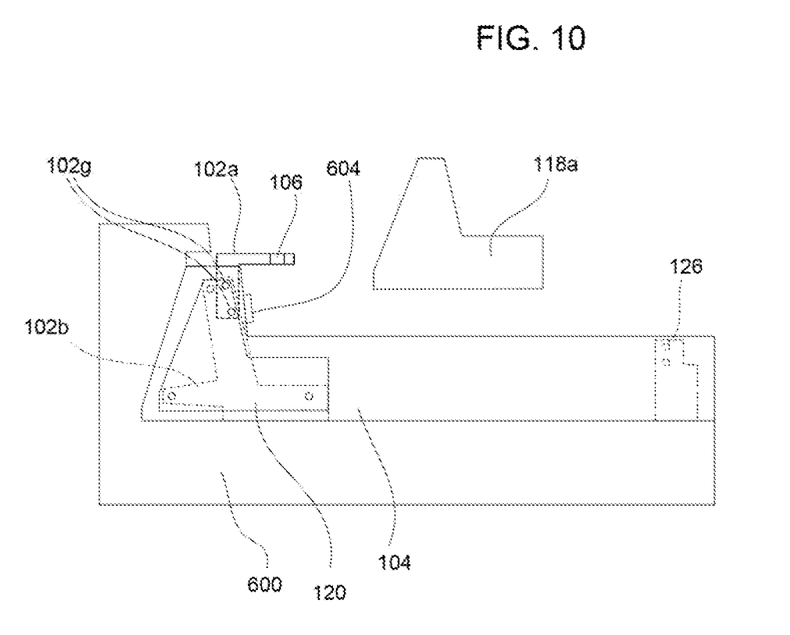

In FIG. 10, the hood platform 102*a* is moved into place and attached to the hood legs 102*b*, 102*c* using suitable fasteners 102*q*. In this case, the fasteners are installed at first and second connection points 110*a*, 110*b* located within the shroud's enclosed volume 114, via access ports 116 located in recesses 120 on each side of the shroud 104. When installed, the accessory mounting points 106 are located outside the enclosed volume 114 of the hood 104, and the hood 102 provides a rigid connection from the accessory mounting points 106 to the base mounting points 108 and the drivetrain tunnel 600.

Figure 11:
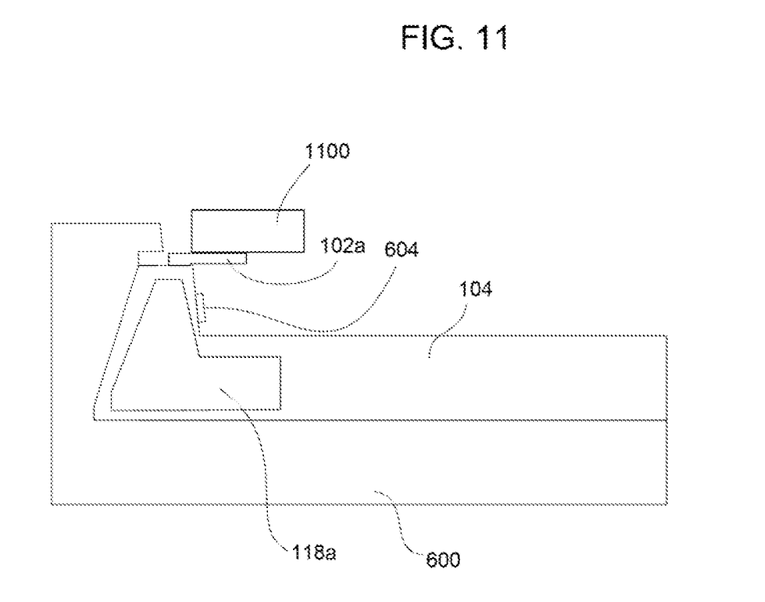

In FIG. 11, access port closures 118*a*, 118*b* are installed to close the recesses 120, and an accessory 1100 is mounted to the hood platform at the accessory mounting points 106. Thus, the weight of the accessory 1100 is transferred via the hood 102 to the drivetrain tunnel 600, independently of the hood 104.

In the illustrated example, the hood platform 102*a* is attached to the legs 102*b*, 102*c* after the shroud 104 is secured to the vehicle. This is not strictly required. In other embodiments, the shroud 104 may include an opening that allows the shroud 104 to be installed with the platform 102*a* and legs 102*b*, 102*c* in place. The shroud 104 also may comprise multiple panels that are assembled in place around the hood 102. In still other embodiments, the hood 102 may comprise a unitary part that is installed prior to installing the shroud 104. Other alternatives and variations will be apparent to persons of ordinary skill in the art in view of the present disclosure.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A console assembly comprising:
   a hood comprising one or more base mounting points configured for installation to a vehicle body structure, and one or more accessory mounting points spaced from and rigidly connected to the one or more base mounting points, the hood comprising one or more structural elements extending between and including the one or more base mounting points and the one or more accessory mounting points, the one or more structural elements including a first leg having at least one first base mounting point, a second leg having at least one second base mounting point, and a platform having at least one first accessory mounting point;
   a shroud defining an enclosed volume, the shroud being configured to install over at least a portion of the hood, with the one or more base mounting points contained within the enclosed volume, and the one or more accessory mounting points located outside the enclosed volume; and
   a cross-brace secured to and extending between the first leg and the second lea, with the cross-brace being located above the one or more base mounting points and below the platform when the one or more base mounting points are positioned to be secured to the vehicle body, wherein, when the hood is attached to the vehicle body structure and the shroud is installed over the hood, the hood is configured to convey respective loads applied to the one or more accessory mounting points to the one or more base mounting points independently of the shroud, wherein the first leg comprises a first sheetmetal part having a respective vertical portion and at least one respective horizontal portion extending in the lateral direction from the vertical portion, and the respective front and rear mounting points comprise front and rear mounting holes located in the at least one horizontal portion, and wherein the second leg comprises a second sheetmetal part having a respective vertical portion and at least one respective horizontal portion extending in the lateral direction from the vertical portion, and the respective front and rear mounting points comprise front and rear mounting holes located in the at least one horizontal portion.

2. The console assembly of claim 1, wherein the platform comprises a unitary part that is separate from and configured to be attached to the first leg and the second leg.

3. The console assembly of claim 2, wherein each of the first leg and the second leg comprises a respective separate unitary part.

4. The console assembly of claim 2, wherein the platform is configured to be attached to the first leg at a first connection point, and to the second leg at a second connection point, and wherein the first connection point and the second connection point are located within the enclosed volume when the hood is attached to the vehicle body and the shroud is installed over at least the portion of the hood.

5. The console assembly of claim 4, wherein the platform is configured to be attached to the first leg and to the second leg while the first leg, the second leg and the shroud are attached to the vehicle body.

6. The console assembly of claim 5 wherein the shroud comprises an opening configured to receive at least a portion of the platform, a first access port positioned adjacent to the first connection point, and a second access port positioned adjacent to the second connection point.

7. The console assembly of claim 6 wherein the shroud comprises a first access port closure configured to selectively close the first access port, and a second access port closure configured to selectively close the second access port.

8. The console assembly of claim 1, wherein the shroud is configured to be connected to the vehicle body structure at one or more locations independent of the one or more base mounting points.

9. The console assembly of claim 1, wherein the shroud is configured to be connected to the hood at one or more locations.

10. The console assembly of claim 1, wherein the one or more base mounting points are configured to install to a drivetrain tunnel of an automobile body.

11. The console assembly of claim 10, wherein the shroud is configured as a center console configured to cover the drivetrain tunnel.

12. The console assembly of claim 11, further comprising a shroud mount configured to be attached to the drivetrain tunnel at a location remote from the hood, and wherein the shroud extends between and covers the one or more base mounting points and the shroud mount.

13. The console assembly of claim 1, wherein the shroud comprises one or more storage locations, and the one more accessory mounting points comprises a horizontally-extending mounting platform located above the one or more storage locations.

14. A console accessory mounting hood comprising:
a first leg having respective front and rear mounting points displaced along a longitudinal direction and configured to secure to a drivetrain tunnel of an automobile body;
a second leg having respective front and rear mounting points displaced along the longitudinal direction and configured to secure to the drivetrain tunnel;
a platform connected to the first leg and the second leg and, when the respective front and rear mounting points of the first leg and the second leg are positioned to be secured to the vehicle body, the platform is positioned above the drivetrain tunnel, first leg and the second leg, and extends in a lateral direction transverse to the longitudinal direction; and
a cross-brace secured to and extending between the first leg and the second leg, with the cross-brace being located above the respective front and rear mounting points of the first leg and the second leg and below the platform when the respective front and rear mounting points of the first leg and the second leg are positioned to be secured to the vehicle body, wherein the platform comprises at least one accessory mounting point, wherein the platform, the first leg and the second leg are configured to convey loads from the at least one accessory mounting point to the vehicle body, wherein the first leg comprises a first sheetmetal part having a respective vertical portion and at least one respective horizontal portion extending in the lateral direction from the vertical portion, and the respective front and rear mounting points comprise front and rear mounting holes located in the at least one horizontal portion, and wherein the second leg comprises a second sheetmetal part having a respective vertical portion and at least one respective horizontal portion extending in the lateral direction from the vertical portion, and the respective front and rear mounting points comprise front and rear mounting holes located in the at least one horizontal portion.

15. The console accessory mounting hood of claim 14, wherein the platform is connected to the first leg by one or more first fasteners, and the platform is connected to the second leg by one or more second fasteners.

16. The console accessory mounting hood of claim 15, wherein the platform and the first leg are configured such that the one or more first fasteners are installed along the lateral direction on a path extending towards the second leg, and wherein the platform and the second leg are configured such that the one or more second fasteners are installed along the lateral direction on a path extending towards the first leg.

17. The console accessory mounting hood of claim 15, wherein:
the first leg comprises a first planar portion extending perpendicular to the lateral direction;
the second leg comprises a second planar portion extending perpendicular to the lateral direction;
the platform comprises a third planar portion extending perpendicular to the lateral direction and positioned in contact with the first planar portion when the platform is connected to the first leg by the one or more first fasteners; and the platform comprises a fourth planar portion extending perpendicular to the lateral direction and positioned in contact with the second planar portion when the platform is connected to the second leg by the one or more second fasteners.

18. The console accessory mounting hood of claim 17, wherein the first leg, the second leg, and the platform are configured such that, when the one or more first connectors are not connecting the first leg to the platform and the one or more second connectors are not connecting the second leg to the platform, the platform is movable parallel to the longitudinal direction to simultaneously slide the third planar portion along the first planar portion and the fourth planar portion along the second planar portion.

19. The console accessory mounting hood of claim 14, wherein the platform comprises:
  a horizontal center section extending in the lateral direction from a first end to a second end;
  a first vertical portion extending from the first end towards the respective front and rear mounting points of the first leg; and
  a second vertical portion extending from the second end towards the respective front and rear mounting points of the second leg;
  wherein the first vertical portion is configured to connect to the respective vertical portion of the first leg, and the second vertical portion is configured to connect to the respective vertical portion of the second leg.

20. The console accessory mounting hood of claim 14, wherein:
  the respective front and rear mounting points of the first leg comprise two or more first mounting holes arranged along the longitudinal direction; and
  the respective front and rear mounting points of the second leg comprise two or more second mounting holes arranged along the longitudinal direction.

21. A method for installing a console assembly, the method comprising:
  rigidly securing a hood having one or more base mounting points and one or more accessory mounting points spaced from and rigidly connected to the one or more base mounting points to an automobile at a drivetrain tunnel of the automobile via the one or more base mounting points, the hood comprising:
    a first leg comprising a first sheetmetal part having a respective vertical portion and at least one respective horizontal portion extending in the lateral direction from the vertical portion, and the one or more base mounting points comprise front and rear mounting holes located in the at least one horizontal portion;
    a second leg comprises a second sheetmetal part having a respective vertical portion and at least one respective horizontal portion extending in the lateral direction from the vertical portion, and the one or more base mounting points comprise front and rear mounting holes located in the at least one horizontal portion;
    a platform having at least one first accessory mounting point of the one or more accessory mounting points, wherein the platform comprises a unitary part that is separate from and configured to be attached to the first leg and the second lea, and
    a cross-brace secured to and extending between the first leg and the second lea, with the cross-brace being located above the one or more base mounting points and below the platform when the one or more base mounting points are positioned to be secured to the vehicle body; and securing a shroud defining an enclosed volume to the automobile with the one or more base mounting points contained within the enclosed volume, and the one or more accessory mounting points located outside the enclosed volume.

22. The method of claim 21, further comprising attaching an accessory to at least one of the one or more accessory mounting points such that a weight of the accessory is transferred via the hood to the drivetrain tunnel independently of the shroud.

23. The method of claim 21, wherein rigidly securing the hood to an automobile at a drivetrain tunnel of the automobile comprises:
  securing the front and rear mounting holes of the first leg to the drivetrain tunnel;
  securing the front and rear mounting holes of the second leg to the drivetrain tunnel; and
  securing the platform to the first leg and the second leg.

24. The method of claim 23, wherein securing the platform to the first leg and the second leg is performed after securing the shroud to the automobile.

25. The method of claim 24, wherein securing the platform to the first leg and the second leg comprises:
  inserting a portion of the platform into the enclosed volume;
  securing the portion of the platform to the first leg at a first connection point located within the enclosed volume; and
  securing the portion of the platform to the second leg at a second connection point located within the enclosed volume.

26. The method of claim 25, wherein the shroud comprises a first access port positioned adjacent to the first connection point, and a second access port positioned adjacent to the second connection point, and the method further comprises:
  securing a first access port closure to close the first access port after securing the portion of the platform to the first leg at the first connection point; and
  securing a second access port closure to close the second access port after securing the portion of the platform to the second leg at the second connection point.

27. The method of claim 23, wherein each of the first leg and the second leg comprises a respective separate unitary part.

28. The method of claim 27, wherein securing the front and rear mounting holes of the first leg to the drivetrain tunnel is performed independently from securing the front and rear mounting holes of the second leg to the drivetrain tunnel.

29. The method of claim 28, further comprising securing a cross-brace to the first leg and the second leg before securing the shroud to the automobile.

30. The method of claim 21, wherein securing the shroud to the automobile comprises securing at least a portion of the shroud to the hood.

31. The method of claim 30, wherein securing the shroud to the automobile comprises:
  securing a shroud mount to the drivetrain tunnel at a location spaced from the hood; and
  securing the shroud to the shroud mount and the hood with the shroud mount within the enclosed volume.

32. The method of claim 21, wherein the shroud is configured as a center console having one or more storage locations.

* * * * *

UNITED STATES PATENT AND TRADEMARK OFFICE
CERTIFICATE OF CORRECTION

PATENT NO. : 11,597,334 B2
APPLICATION NO. : 17/119619
DATED : March 7, 2023
INVENTOR(S) : Stephen Telesco et al.

It is certified that error appears in the above-identified patent and that said Letters Patent is hereby corrected as shown below:

In the Claims

In Claim 1, Column 12, Line 63, "leg and the second lea, with the cross-brace being" should read -- leg and the second leg, with the cross-brace being --

In Claim 21, Column 15, Line 61, "first leg and the second lea, and" should read -- first leg and the second leg, and --

In Claim 21, Column 15, Line 63, "leg and the second lea, with the cross-brace being" should read -- leg and the second leg, with the cross-brace being --

Signed and Sealed this
Eighteenth Day of April, 2023

Katherine Kelly Vidal
*Director of the United States Patent and Trademark Office*